Nov. 18, 1941.    R. J. BROOKS    2,263,160
CHAIN BLOCK
Filed Feb. 12, 1940    2 Sheets-Sheet 1
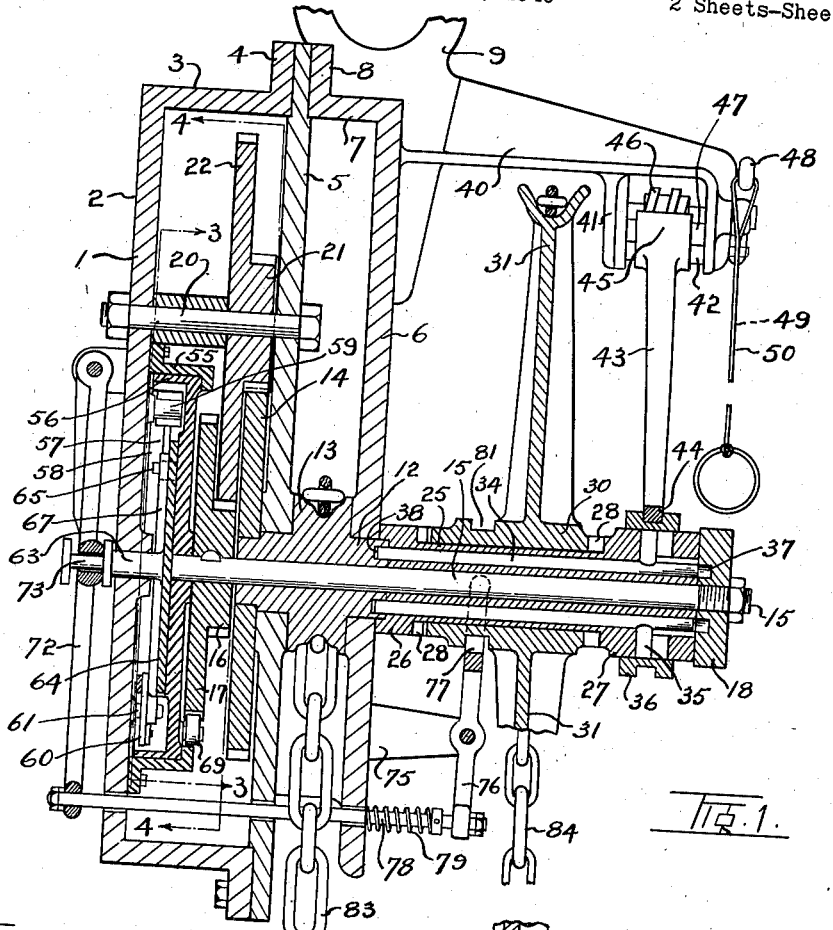
Fig. 1.
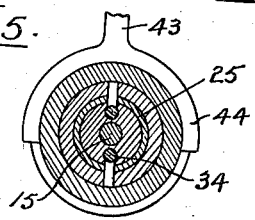
Fig. 5.
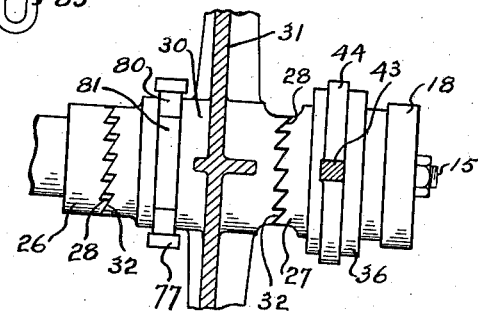
Fig. 2.
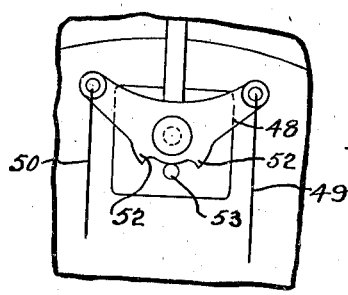
Fig. 6.
INVENTOR.
ROBERT JOHN BROOKS.
ATTORNEY.

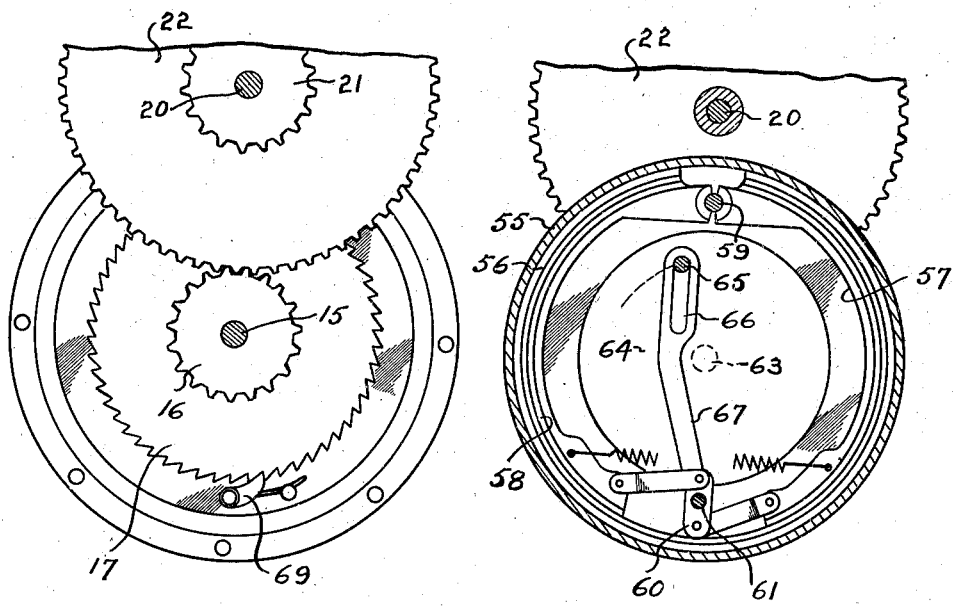

Patented Nov. 18, 1941

2,263,160

UNITED STATES PATENT OFFICE 2,263,160

CHAIN BLOCK

Robert John Brooks, Matsqui, British Columbia, Canada

Application February 12, 1940, Serial No. 318,430

3 Claims. (Cl. 254—169)

My invention relates to improvements in chain blocks. The objects of the invention are to provide means whereby the hand chain wheel may be directly coupled to the load chain sprocket for direct load or connected to the load line through a gear reduction, and also to provide an automatic brake to hold the load in any desired position or to the lower the load at any speed desired through the controlling medium of the hand chain wheel, such braking action being available either when the hand chain wheel is directly coupled to the load chain sprocket or when it is connected thereto through the reduction gear train.

The invention consists of a chain block having a hand wheel operably connected to a load chain sprocket and a brake adapted to retard or stop the lowering of the load through the rotation of the hand wheel, as will be more fully described in the following specification and shown in the accompanying drawings, in which:

Fig. 1 is a longitudinal sectional view of the invention.

Fig. 2 is an elevational view of the brake control sleeve.

Fig. 3 is a transverse sectional view of the brake taken on the line 3—3 of Fig. 1.

Fig. 4 is a transverse sectional view taken on the line 4—4 of Fig. 1.

Fig. 5 is a transverse sectional view showing the change speed clutch pins.

Fig. 6 is a detail elevational view of the change speed trip bell crank.

In the drawings like characters of reference indicate corresponding parts in each figure.

The numeral 1 indicates a housing consisting of an end wall 2 provided with surrounding walls 3 and a flange 4, a centre wall 5 and a face plate 6 having surrounding walls 7 and a flange 8 through which fastening means, not shown, are provided for securing the component parts of the housing together. The housing 1 is provided with an eye 9 for suspending the chain block.

Journalled between the face plate 6 and the centre wall 5 is a part of a hub 12 upon which a load chain sprocket 13 is formed. The hub is fitted at one end with a gear wheel 14 and is concentrically bored to form a bearing for a shaft 15. The shaft 15 is fitted at one end with a pinion 16 and a ratchet wheel 17, both of which are secured to the shaft. The shaft is fitted at its opposite end with a drive collar 18. Rotatable about a shaft 20 is a gear 21 which meshes with the gear 14 and a gear 22 coupled to the gear 21 which meshes with the pinion 16.

Journalled upon the outer end of the shaft 15 is a sleeve 25, see Figures 1 and 5, having a fixed collar 26 at one end and a similar collar 27 at its outer end. These collars are provided on adjacent faces with saw tooth racks 28. Fitted upon the sleeve 25 is a hub 30 which forms part of a hand chain wheel 31. The hub 30 is provided with saw tooth racks 32 at its ends which correspond to the racks 28 of the collars 26 and 27.

The hub 30 is slightly shorter than the space between the collars 26 and 27, so that when the wheel 31 is rotated to lower the load, it slides along the sleeve 25 due to the co-acting inclines of the saw tooth racks 28 and 32 of the collar 26 and the hub 30 and coincidentally as the wheel is turned in the reverse direction to permit the load to be raised, the inclines of the saw tooth racks of the hub and the collar 27 cause the hub and hand chain wheel 31 to move towards the housing. The endwise movement of the hub 30 is obviously completed before rotary movement is imparted to the sleeve 25. The sleeve 25 is longitudinally bored to slidably carry a plurality of drive rods 34 which are collectively connected by pins 35 to a grooved collar 36. The rods 34 are adapted to enter concentrically arranged recesses 37 formed in the drive collar 18 or similar apertures 38 formed in the end of the hub 12.

Extending from the face plate 6 is a bracket 40 supporting at its outer end a fork 41. Adjacent the lower extremity of the fork 41 a shaft 42 is provided upon which an arm 43 is slidably mounted. The arm 43 is provided with a fork 44 to engage the grooved collar 36 and is fitted at its upper end with an integral half nut 45 which is engaged by a worm 46 journalled on a shaft 47 in the fork 41. The shaft 47 is fitted with a bell crank 48, to the ends of which cords 49 and 50 are attached. The rocking movement of the bell crank 48 is limited by means of stops 52 engaging a pin 53 extending from the fork 41. When the cord 49 is pulled to rock the bell crank 48 the grooved collar 36 and its connected drive rods 34 are moved to engage the hub 12, thus a direct drive from the hand chain wheel 31 to the load chain sprocket 13 is obtained. When the cord 50 is pulled, the rods 34 are withdrawn from engagement with the hub 12 and enter the recesses 37 of the drive collar 18 upon the shaft 15, thus causing the hand chain wheel to rotate the load chain wheel through the gears 16, 22, 21 and 14 at a reduced speed.

A ring bearing 55 is fitted upon the inner face of the end wall 2 of the housing and rotatably mounted within the bearing is a brake drum 56 which is freely rotatable upon the shaft 15. Fitted within the brake drum 56 is an expanding brake generally indicated by the numeral 57. The brake 57 consists of brake shoes 58 fulcrumed upon a pin 59 carried from the end wall 2 and urged into contact with the brake drum through a toggle 60 which is fulcrumed upon a pin 61, which pin is carried also from the end wall 2. Secured upon a stub shaft 63 is a disc 64, see Figure 1, shown in dotted line in Figure 3, which stub shaft is aligned with but is separate from the shaft 15 and is adapted for slight endwise movement into or out of engagement with the inner face of the brake drum 56. The disc 64 is provided with a crank pin 65 which enters a slot 66 of a brake lever 67. The lever 67 is fitted to the toggle 60 to expand the brake shoes 58. The outer face of the brake drum 56 carries one or more spring loaded pawls 69, see Figures 1 and 4, which engage the ratchet wheel 17, so that when the ratchet wheel is rotating while the load is being lowered, the ratchet wheel through the pawls 69 drive the brake drum 56, but the pawls slip when the load is being raised. A depending arm 72, see Figure 1, is pivotally carried from the end wall 2 and bears intermediate its length upon the end of the stub shaft 63 of the disc 64. The stub shaft is provided with a capped pin 73 which extends through the arm 72 to withdraw the disc from contact with the brake drum 56, when the load chain is being lowered without load.

A bracket 75 on the face plate 6 supports a rocking arm 76 which is provided with a trunnion fork 77 at its upper end and is connected at its lower end by a rod 78 extending to the arm 72. The rod 78 is provided with a spring 79 which serves to hold the disc 64 in contact with the brake drum 56. The trunnion fork 77 engages trunnion blocks 80, see Figure 2, which ride in a groove 81 surrounding the hub 30 of the hand wheel 31. The load chain sprocket is provided with a load chain 83 and the hand wheel 31 is provided with an endless hand chain 84.

The operation of the invention is as follows:

In lowering the hook on the load chain 83 it will be preferable to pull the cord 49 to clutch the sleeve 25 to the hub 12 for direct drive, as shown in Figure 1. By pulling on the chain 84 to rotate the hand wheel 31 in a clockwise direction as viewed from the right of Figure 1 the hub 12 and load chain sprocket 13 will be rotated to lower the hook. The chain wheel will be urged by the inclines of the teeth 28 of the collar 26 towards the collar 27, thus swinging the arm 76 to compress the spring 78 and move the arm 72 away from the housing, thus allowing the disc 64 to become disengaged from the brake drum, that said brake drum may be rotated by the ratchet wheel 17 through the pawl 69.

To raise the hook and its load the hand chain wheel will be rotated in an anti-clockwise direction. The initial pull on the chain 84 will cause the chain wheel 31 to ride towards the collar 26 and through the arms 76 and 72 cause the disc 64 to bear against the brake drum to prevent it from rotating, but the ratchet wheel 17 is left free to rotate with the pawl 69 slipping. As soon as lifting strain on the chain 84 is relieved the clockwise pull on the load chain 83 and the tendency of the ratchet wheel 17 to rotate in a clockwise direction will impart rotation to the disc 64 through the pawl and rock the brake lever 67 and apply the brake to sustain the load. The application of the brake is proportionate to the load, consequently to lower the load the chain wheel 31 must be rotated by the chain 84 in a clockwise direction. The effort expended in so rotating the chain wheel causes said wheel to move towards the collar 27 and reduce the tension on the brake through the reduction of pressure between the disc 64 and the brake drum 56. The stopping of rotation of the hand wheel is immediately followed by the stopping of the downward movement of the load.

What I claim as my invention is:

1. A chain block comprising a load chain sprocket having a hub, said hub being connected at one end to a reduction gear train, the opposite end of said hub having a clutch element, a shaft extending through said hub connecting at one end to said reduction gear train and having a clutch element at its free end, a sleeve mounted upon said shaft between the clutch elements and means carried by said sleeve for selectively engaging the clutch elements, a hand chain wheel for rotating the sleeve and means for moving the means to engage each of the clutch elements.

2. A chain block comprising a load chain sprocket having a hub, said hub being connected at one end to a reduction gear train, the opposite end of said hub having a clutch element, a shaft extending through said hub connecting at one end to said reduction gear train and having a clutch element at its free end, a sleeve mounted upon said shaft between the clutch elements, means carried by said sleeve for selectively engaging the clutch elements, a hand chain wheel for rotating the sleeve, means for moving the means to engage each of the clutch elements, means on the sleeve rockingly mounting said hand chain wheel, said hand chain wheel having endwise movement on the sleeve incidental to the rocking movement, a brake normally retarding the rotation of the load chain sprocket incidental to the load, and means as the hand chain wheel is rocked relative to the sleeve in response to load for applying the brake.

3. A chain block comprising a shaft, a load chain sprocket journalled upon the shaft, a sleeve journalled upon the shaft, and clutch means for selectively connecting the sleeve to the shaft and the sleeve to the load chain sprocket, a hand chain wheel rockingly mounted upon the sleeve, said wheel having a hub provided with inclined clutch elements at each end and said sleeve having coacting clutch elements, said last mentioned clutch elements being so spaced as to cause the inclines of the clutch elements at one end of the hub to slide along the inclines of their coacting clutch elements and impart endwise movement to the hand wheel along the sleeve, a ratchet wheel secured to the shaft, a freely rotatable brake drum aligned with the ratchet wheel, said brake drum having a pawl engaging the ratchet wheel, an endwise movable disc adapted to engage the brake drum, a brake shoe connected to the disc to cause it to engage the brake drum when said disc is rocked about its axis, means connecting the hand chain wheel to the disc to impart frictional engagement between the disc and the brake drum as the hand chain wheel is moved endwise of the sleeve in one direction.

ROBERT JOHN BROOKS.